(12) United States Patent
Beaman

(10) Patent No.: US 6,419,397 B1
(45) Date of Patent: Jul. 16, 2002

(54) HOUSED STEERING COLUMN

(75) Inventor: Michael D. Beaman, Torrington, CT (US)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/727,802

(22) Filed: Dec. 1, 2000

(51) Int. Cl.$^7$ ............................................... F16C 19/20
(52) U.S. Cl. ........................................ 384/521; 284/520
(58) Field of Search ............................. 384/43, 45, 49, 384/447, 490, 495, 492, 520, 521, 528, 529

(56) References Cited

U.S. PATENT DOCUMENTS

| | | | |
|---|---|---|---|
| 3,425,759 A | 2/1969 | Schwarzschild | 308/188 |
| 3,574,425 A | 4/1971 | Johnson et al. | 308/200 |
| 4,492,415 A | 1/1985 | Baile et al. | 384/463 |
| 4,799,810 A | 1/1989 | Gilbert | 384/606 |
| 4,906,110 A | 3/1990 | Van Wyk et al. | 384/463 |
| 5,467,662 A | 11/1995 | Lange et al. | 74/459 |
| 5,485,760 A | 1/1996 | Lange | 74/459 |
| 5,615,955 A * | 4/1997 | Namimatsu et al. | 384/13 |
| 5,749,266 A | 5/1998 | Tsukada | 74/459 |
| 5,782,135 A | 7/1998 | Kondo et al. | 74/459 |
| 5,904,426 A | 5/1999 | Tsuru et al. | 384/462 |

* cited by examiner

Primary Examiner—Christopher P. Schwartz
Assistant Examiner—C. T. Bartz
(74) Attorney, Agent, or Firm—John C. Bigler

(57) ABSTRACT

A housing encloses at least a portion of a steering shaft, and a preloaded ball bearing mounted within the housing supports the steering shaft. The preloaded ball bearing has loaded balls that are preloaded and unloaded balls that are free floating, an unloaded ball being positioned between each loaded ball. A split raceway provides two angular contact raceways that are preloaded axially against the loaded balls.

5 Claims, 2 Drawing Sheets

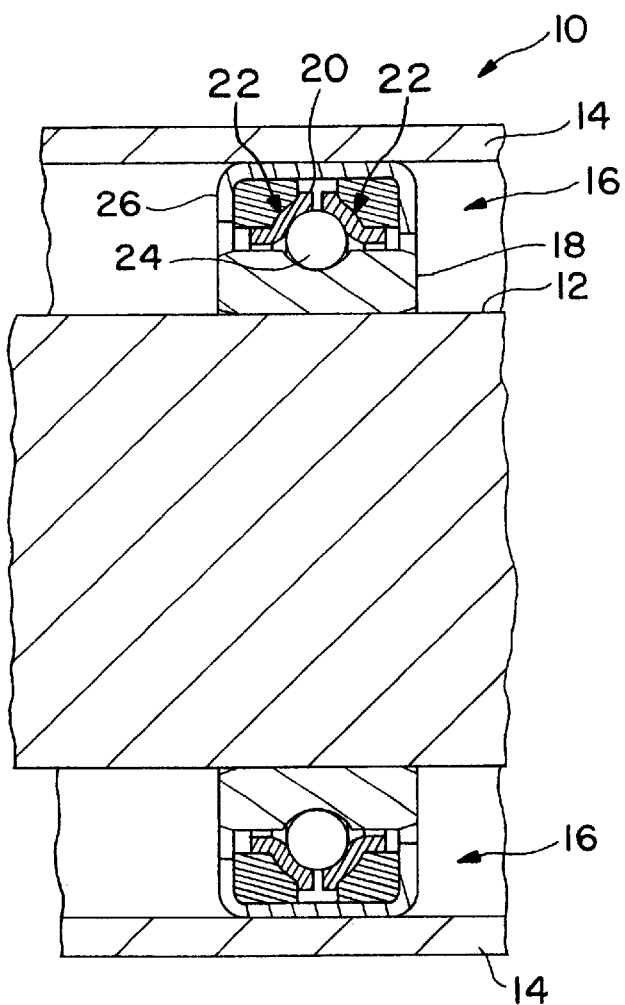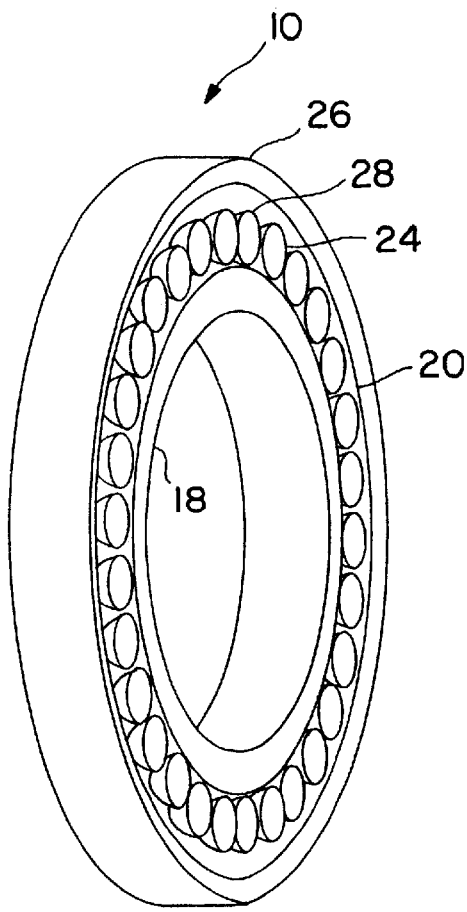
FIG. 1
FIG. 2

HOUSED STEERING COLUMN

BACKGROUND OF THE INVENTION

This invention relates generally to steering columns for motor vehicles and, more particularly, to steering columns that have a steering shaft supported by a bearing within a housing.

Current automotive steering columns require bearings that provide high stiffness without high torque, even when operating with misalignment and variations in press fit of the bearing. A preferred type of bearing for such applications is a zero clearance ball bearing. Generally, the bearings that are used have a full complement of balls because there is inadequate space for a cage or ball separator. However, when the bearings are under load, the balls contact each other and bind, causing high torque spikes. This condition is known as "ball gagging".

The trend is for automotive manufacturers to increase steering column natural frequency, requiring higher and higher bearing stiffness. Current bearing designs can only marginally meet today's requirements, even with 100 percent inspection by hand and a significant percentage of bearings being rejected as scrap. Further increases in bearing preload, as a means to increase bearing stiffness beyond today's levels, are not possible with the current bearing designs because of the high torque spikes caused by ball gagging.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a housed steering column comprising a steering shaft, a housing enclosing at least a portion of the steering shaft, and a preloaded ball bearing mounted within the housing and supporting the steering shaft. The preloaded ball bearing has loaded balls that are preloaded and unloaded balls that are free floating, an unloaded ball being positioned between each loaded ball. A split raceway provides two angular contact raceways that are preloaded axially against the loaded balls.

The foregoing and other aspects will become apparent from the following detailed description of the invention when considered in conjunction with the accompanying drawing figures.

BRIEF DESCRIPTION OF THE DRAWING FIGURES

FIG. 1 is a cross sectional view of a housed steering column illustrating the present invention;

FIG. 2 is a cutaway pictorial view of the preloaded ball bearing of FIG. 1 showing half the bearing removed;

DETAILED DESCRIPTION

Figure 3:
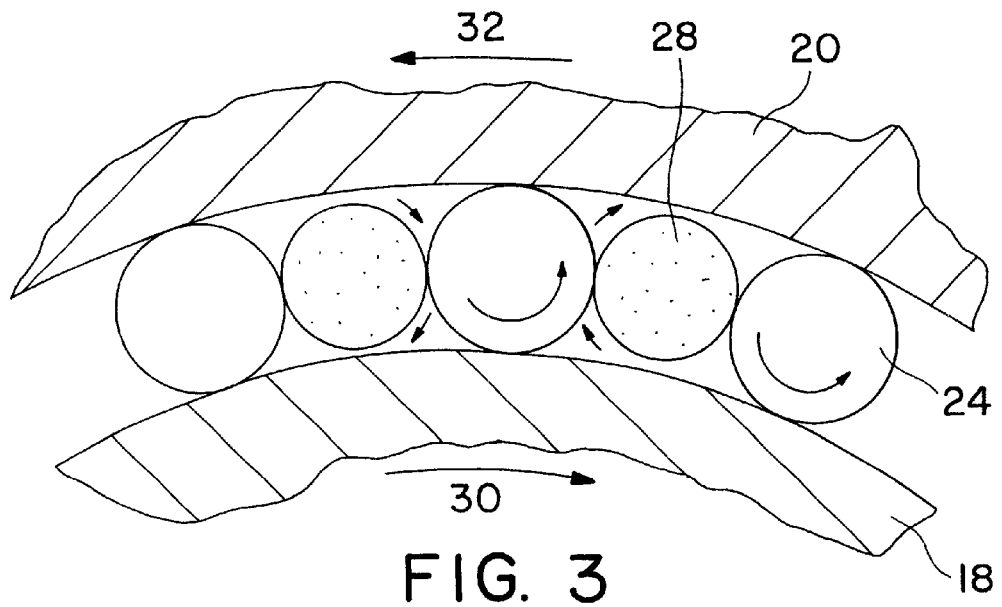
FIG. 3 is a drawing of bearing raceways and loaded and unloaded balls of the preloaded ball bearing of FIG. 1.

Referring now to the drawings, FIG. 1 illustrates a housed steering column 10 according to the present invention comprising a steering shaft 12, a housing 14 enclosing at least a portion of the steering shaft 12, and a preloaded ball bearing 16.

The preloaded ball bearing 16 has a machined inner race 18, and a two-piece outer race 20 that provides two angular contact raceways that are preloaded by resilient biasing members 22 against loaded balls 24. A drawn cup 26 encloses the resilient biasing members 22, compressing them together, and is pressfit into the housing 14. The machined inner race 18 is pressfit over the steering shaft 12. As shown in FIG. 2, unloaded balls 28 (indicated by stippled shading) are also located in the angular contact raceway provided by the inner and outer races 18 and 20, one unloaded ball 28 being positioned between each loaded ball 24.

The unloaded balls 28 may be made slightly undersize, i.e., with a diameter slightly less than that of the loaded balls 24, so that the unloaded balls 28 are free floating and serve to separate the loaded balls rather than carry load. Alternatively, or in addition to being slightly undersize, the unloaded balls 28 may be made of a polymer, such as, for example, acetal, nylon or polypropylene, or of another type of material with a stiffness less than the material (typically steel) of the loaded balls 24, so that unloaded balls are free floating and do not carry load. The free floating balls effectively separate the loaded balls without the space requirements of a ball cage or separator.

FIG. 3 shows the directions of rotation of the loaded and unloaded balls 24 and 28 as the adjacent inner and outer races 18 and 20 undergo relative rotation, indicated by the arrows 30 and 32. Note that there is minimal scuffing of unloaded balls 28 against loaded balls 24 because there the directions and rotational speeds of the balls are complementary. There is some scuffing of the unloaded balls 28 against the races 18 and 20 due to the generally opposite directions of adjacent surfaces, but such scuffing does not result in ball gagging because those balls are undersize or otherwise without load.

Figure 4:
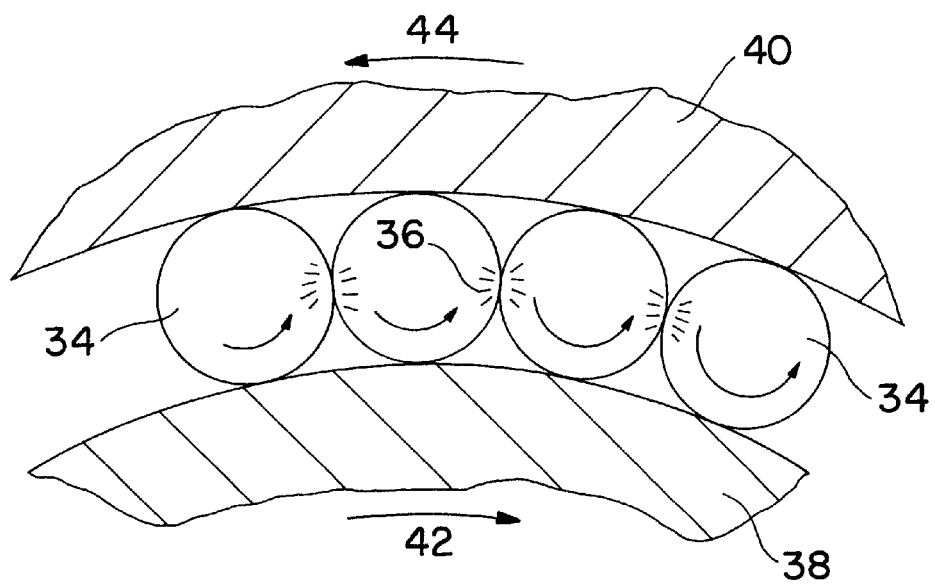
FIG. 4 is a drawing of bearing raceways and loaded balls of a preloaded ball bearing according to the prior art.

In contrast to the present invention, current zero clearance ball bearings used in housed steering columns have loaded balls 34 arranged in a full complement such that each loaded ball 34 scuffs against an adjacent loaded ball 34 with their surfaces moving in generally opposite directions, as indicated in FIG. 4. As a result of this scuffing, when the preload of the split outer race is increased to increase bearing stiffness, ball gagging occurs at the contact points indicated at numeral 36, in response to relative rotation of the inner and outer races 38 and 40, indicated by the arrows 42 and 44.

Applicant has found that the current zero clearance ball bearings with full complement loaded balls require 100 percent inspection and a high (barely acceptable) rate of scrap to meet automobile manufacturers' current requirements of a bearing stiffness of 4,000 newtons per millimeter and are unable to meet new bearing stiffness requirements that may be above 10,000 newtons per millimeter. However, Applicant has found that, with the present invention, bearing stiffness requirements of 5,000 and even more that 10,000 newtons per millimeter can be met without 100 percent inspection and without high rates of scrap.

Having described the invention, what is claimed is:

1. A housed steering column comprising:
   a steering shaft;
   a housing enclosing at least a portion of the steering shaft; and
   a preloaded ball bearing mounted within the housing and supporting the steering shaft, the preloaded ball bearing comprising
      loaded balls that are preloaded and unloaded balls that are free floating, an unloaded ball being positioned between each loaded ball; and
      a split raceway providing two angular contact raceways that are preloaded axially against the loaded balls.

2. The housed steering column according to claim 1, wherein the preloaded ball bearing has sufficient preload to provide a bearing stiffness of at least 5000 newtons per millimeter.

3. The housed steering column according to claim 1, wherein the unloaded balls are smaller in diameter than the loaded balls.

4. The housed steering column according to claim 3, wherein the unloaded balls are made of steel.

5. The housed steering column according to claim 1, wherein the unloaded balls are made of a polymer and the loaded balls are made of steel.

* * * * *